May 23, 1939.  E. S. ELLIS  2,159,888
FLASH TRIMMING APPARATUS
Filed Nov. 2, 1936  4 Sheets-Sheet 1

INVENTOR
EMMETT S. ELLIS
BY
ATTORNEYS

May 23, 1939.  E. S. ELLIS  2,159,888
FLASH TRIMMING APPARATUS
Filed Nov. 2, 1936  4 Sheets-Sheet 4
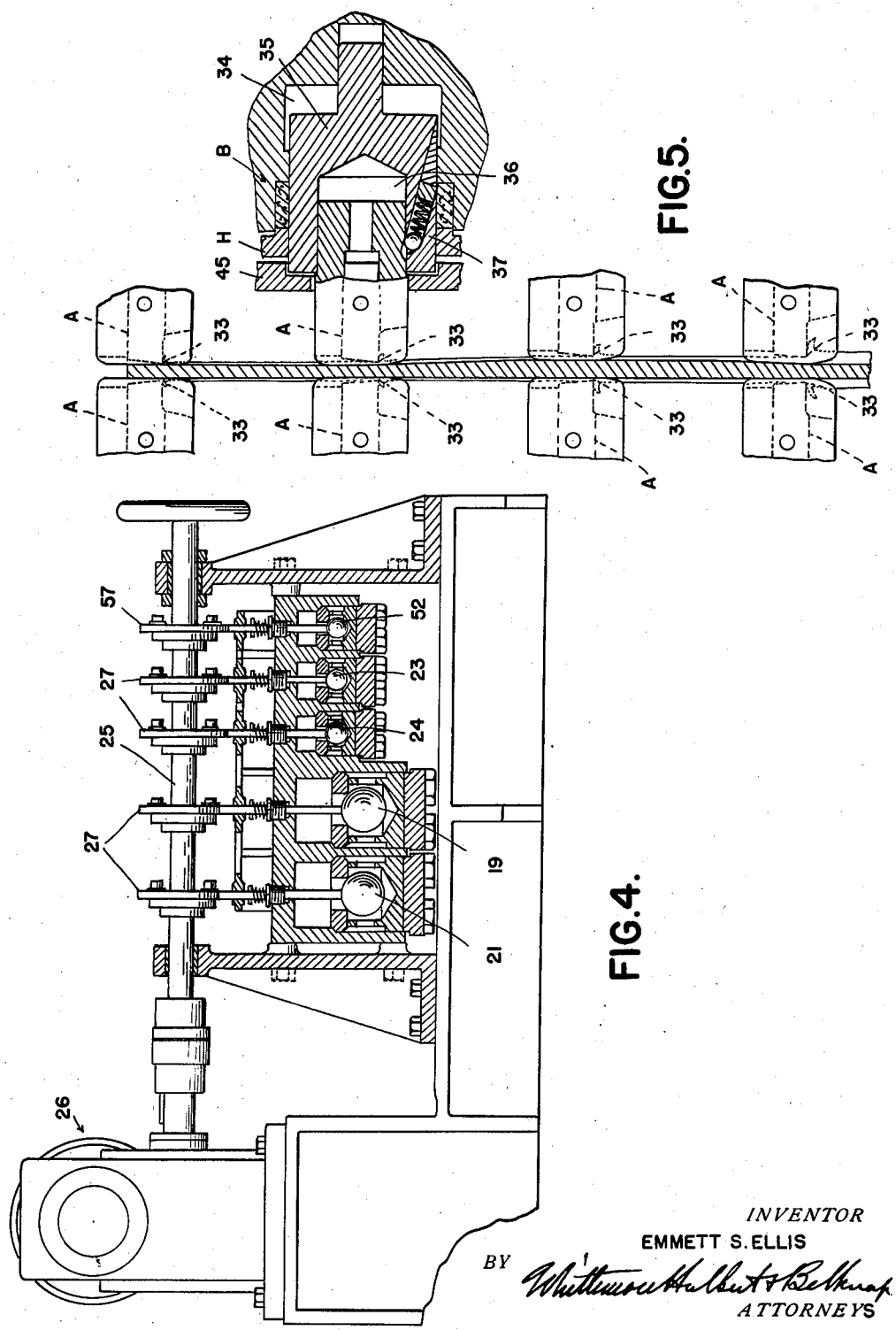
INVENTOR
EMMETT S. ELLIS
BY
ATTORNEYS Patented May 23, 1939

2,159,888

UNITED STATES PATENT OFFICE 2,159,888

FLASH TRIMMING APPARATUS

Emmett S. Ellis, Detroit, Mich., assignor to Kelsey-Hayes Wheel Company, Detroit, Mich., a corporation of Delaware Application November 2, 1936, Serial No. 108,886

9 Claims. (Cl. 90—38)

This invention relates generally to a metal working machine and refers more particularly to improvements in machines for removing the flash or excess metal resulting from welding operations.

One of the principal objects of this invention resides in the provision of a flash trimming machine equipped with means for automatically compensating for variations in thickness and profile of the stock along the weld as the flash is removed by the trimming cutters.

Another advantageous feature of the present invention consists in the provision of trimming cutters supported for movement in directions toward and away from the stock and adapted to follow the profile of the stock during the trimming operation. With this construction, the flash is completely removed irrespective of variations in thickness of the stock or variations in the surface profile of the latter, and this is accomplished without any danger of the cutters reducing the thickness of the stock at the weld.

A further object of the present invention resides in the provision of a flash trimming machine of the character previously set forth embodying hydraulically operated means for moving the trimming cutters in a direction toward the stock and having a cylinder containing a compressible medium arranged in the hydraulic system to permit the required movement of the cutters in directions toward and away from the stock during the trimming operation to compensate for variations in the thickness and profile of the stock at the weld.

The foregoing, as well as other objects, will be made more apparent as this description proceeds, especially when considered in connection with the accompanying drawings, wherein:

Figure 4 is a sectional view illustrating the valve arrangement;

Figure 5 is a semi-diagrammatic view partly in section and illustrating the manner in which the cutters operate upon the flash resulting from the weld;

Figures 1, 6, 7:
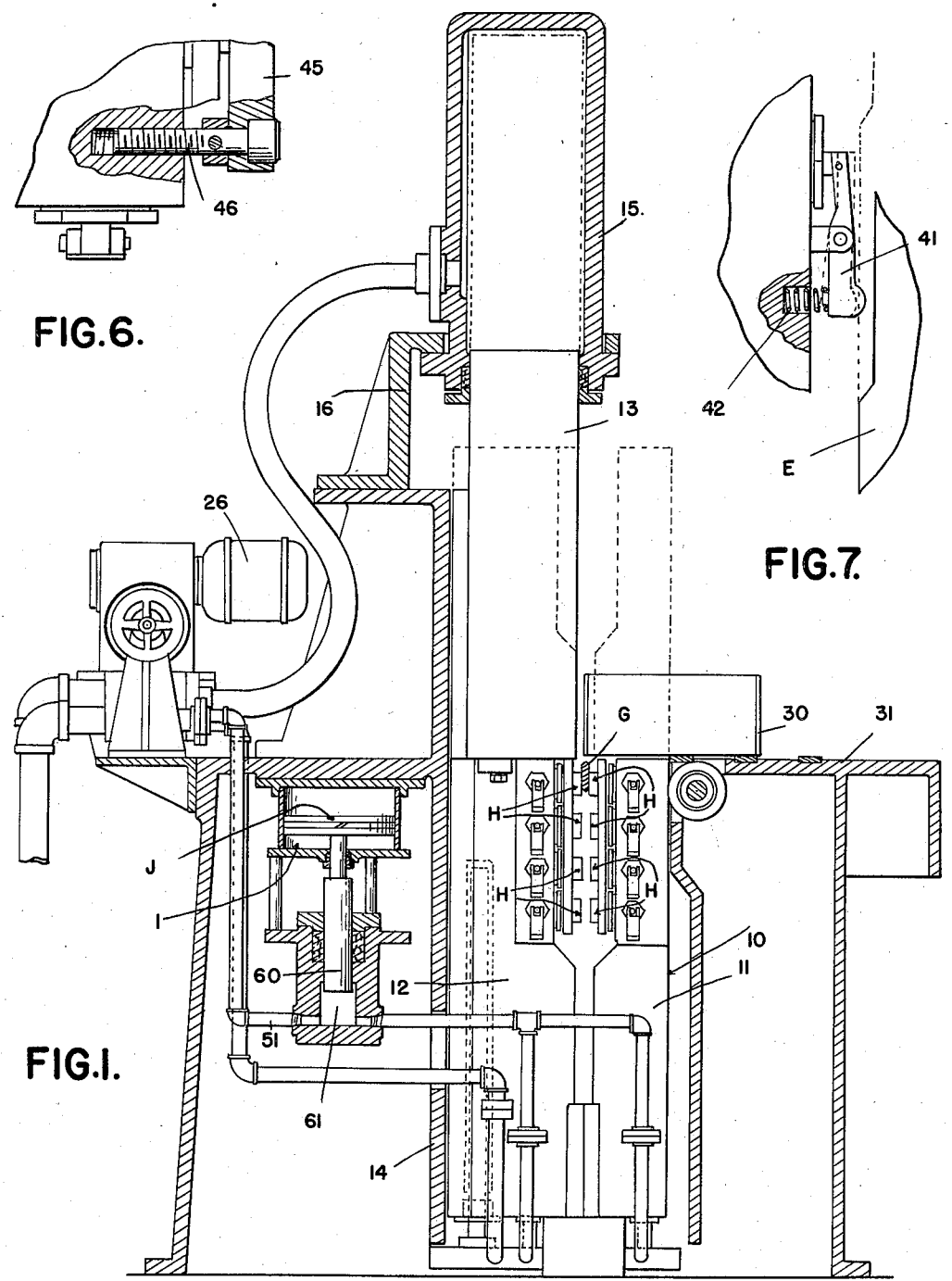
Figure 1 is a sectional view through a machine constructed in accordance with this invention.
Figure 6 is a fragmentary view partly in section of a part of the machine forming the subject matter of this invention.
Figure 7 is a fragmentary elevational view partly in section of another part of the machine illustrated.

The embodiment of the invention selected herein for the purpose of illustration is principally adapted to remove the flash resulting from butt welding adjacent ends of a hooped blank together to form an annulus, although, it will be understood that the principles of the machine are equally applicable in all instances where it is desired to effectively remove the flash resulting from a welding operation.

In general, a plurality of pairs of cutters A are supported in vertical spaced relationship for reciprocation as a unit in a vertical direction with the cutters of each pair opposed to one another in the manner diagrammatically shown in Figure 5. The cutters of each pair are individually moved to their innermost positions by hydraulically operated means B reciprocable as a unit with the cutters and embodying intake and exhaust valves C and D, respectively, automatically operated by suitable fixed cams E and F, respectively, as the cutters are reciprocated in the vertical direction aforesaid. As the cutters and associated hydraulically operated means are moved in a downward direction relative to the cams, from the dotted line position thereof shown in Figure 1 to the full line position illustrated in the same figure, the intake valves C are successively opened and the exhaust valves D are correspondingly closed effecting inward movement of the cutters. Upon continued downward movement of the cutters, the latter successively receive therebetween the flash of the weld integrally joining adjacent ends of the hooped blank, and the extent of inward movement of the pairs of cutters is so determined that the distance between the cutting edges gradually decreases from the lowermost pair of cutters to the uppermost pair of cutters. It will, of course, be understood that the distance between the uppermost pair of cutters approximates the actual thickness of the work blank so as to completely remove the flash and provide a smooth finished surface. When the several pairs of cutters complete their downward travel and clear the work, the cams E disengage the intake valves C, permitting the latter to close and the cams F engage the exhaust valves D to open the latter. Another work blank is then supported in proper position on the table and the cutters are returned to their uppermost position. A suitable separating cam G is located just beneath the blank in the position shown in Figure 1 to successively move the cutters away from each other a sufficient distance to permit the same to clear the flash on the blank.

Although, in the present instance, the cutters are urged toward each other by a relatively noncompressible fluid acting on the means B, nevertheless, each pair of cutters actually follows the profile of the blank adjacent the weld and thereby compensates for variations in surface contour or thickness of the blank. For example, if the thickness of the blank increases slightly from the top edge of the blank to the bottom of the latter, the cutters are moved away from each other a corresponding distance as they successively progress along the weld and, as a consequence, completely remove the flash without cutting the blank. Briefly, the foregoing is accomplished by providing an air cylinder I in the hydraulic medium supply line extending from the source to the valves, and by securing each cutter to a positioning member H having portions on opposite sides of the cutting edges of the cutters engageable with the blank. These contacting portions may be an integral part of the positioning member, as shown, or may be rollers. Upon reference to Figure 1, it will be noted that as the relatively non-compressible hydraulic medium flows to the valves, it passes through the lower end of the cylinder I at the underside of the piston J, and upward movement of the latter in the cylinder I by the hydraulic medium is resisted by the action of a compressible fluid medium on the top of the piston J. The construction is such as to permit the fluid medium in the cylinder I above the piston J to be compressed by the hydraulic medium displaced in a reverse direction through the supply line by the positioning members when the latter encounter a portion of the blank which is thicker than the portion previously engaged thereby. Inasmuch as the cutters are secured to the positioning members, it necessarily follows that the cutting edges of the cutters move outwardly with the shoes a distance corresponding to the increase in thickness of the stock. It will, of course, be understood that the pressure of the hydraulic medium acting on the means B will maintain the positioning members in frictional contact with the blank so that if these members encounter a thinner section of the stock, the cutters are automatically moved inwardly to compensate for the change in width.

Referring now to the drawings, it will be noted that the machine forming the subject matter of this invention is shown in Figure 1 as having a vertically reciprocable ram 10 comprising laterally spaced sections 11 and 12 secured at their upper ends to a plunger 13. The laterally spaced sections of the ram are guided by the machine frame 14, and the plunger 13 is slidably mounted in a cylinder 15 secured to the machine frame by means of a bracket 16. The ram 10 is reciprocated by suitable means and, as shown herein, fluid is alternately introduced under pressure from a supply line 17 into the cylinder 15 above the plunger 13 and into a cylinder 18 formed in the lower end of the section 12 of the ram. Upon reference to the diagram shown in Figure 3, it will be noted that the cylinder 15 communicates with the fluid pressure supply line 17 through the medium of an intake valve 19 and communicates with a return line through the medium of an exhaust valve 21. It will also be observed that the cylinder 18 in the section 12 of the ram 10 communicates at the lower end with a conduit 22 having the opposite end respectively communicating with the supply line 17 and return line 20 through the medium of intake and exhaust valves 23 and 24.

The four valves mentioned above are automatically operated in timed relationship by means of a cam shaft 25 driven by a prime mover 26 and having a plurality of cams 27 corresponding in number to the number of valves for actuating the latter. The contour of the cams 27 is such that when the ram 10 is in its lowermost position shown by the full lines in Figure 1, the exhaust valve 21 is opened and the intake valve 19 is closed so that the cylinder 15 is connected through the valve 21 to the return line 20. At the same time, the intake valve 23 is opened and the exhaust valve 24 is closed permitting fluid under pressure to flow from the supply line through the conduit 22 to the cylinder 18. As the fluid pressure builds up in the cylinder 18, the ram is raised to the dotted line position thereof shown in Figure 1. When the ram reaches its uppermost position, the intake valve 23 is closed by its associated cam and the exhaust valve 24 is opened by its cam permitting the fluid to escape back through the conduit 22 to the return line 20. The cams controlling the valves 19 and 21 are simultaneously actuated to close the exhaust valve 21 and to open the intake valve 19. This permits fluid under pressure to flow from the supply line 17 into the cylinder 15 and effects a downward movement of the ram 10.

In accordance with the present invention, the flash is removed from the blank as the ram 10 is lowered from the dotted line position thereof shown in Figure 1 to the full line position indicated in the same figure. The cutters A for accomplishing the above result are secured to the ram 10 in pairs with the cutters of each pair opposed to one another. The series of cutters at one side are secured in vertical spaced relationship to the inner surface of the section 12 of the ram and the opposed series of cutters are secured in correspondingly spaced relationship to the inner surface of the section 11 of the ram directly opposite the series aforesaid. The work blank 30 is secured on the table 31 of the machine when the ram 10 is in its lowermost position, and care is taken in locating the blank so that the opposed cutters will pass on opposite sides of the welded joint directly opposite the flash.

Figure 2:
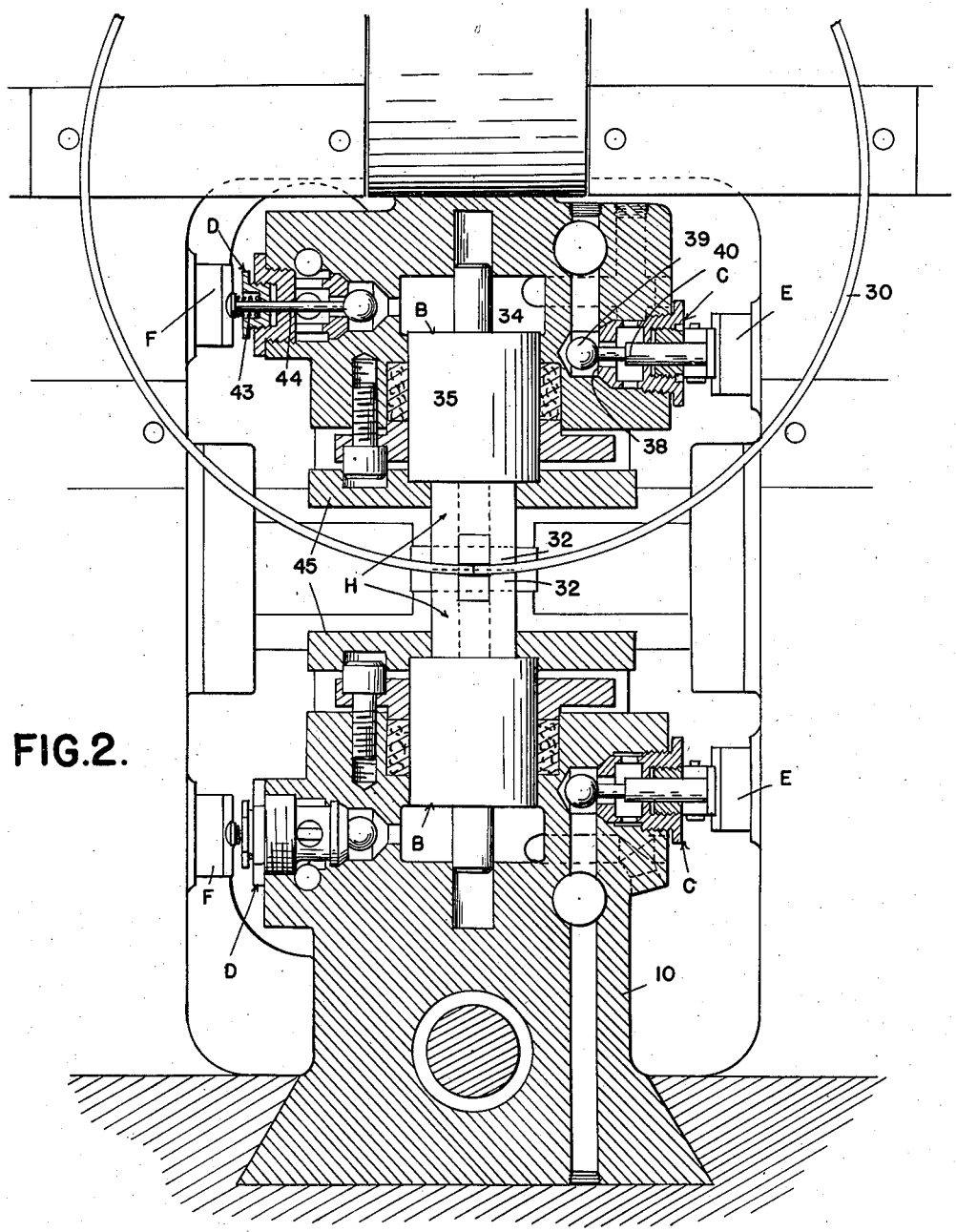
Figure 2 is a cross sectional view through the machine shown in Figure 1, with the parts in a different position.

Upon reference to Figures 2 and 5, it will be noted that each cutter is adjustably secured to a positioning member H having portions 32 on opposite sides of the cutter engageable with the blank on opposite sides of the flash. The relationship between the cutting edges 33 of the cutters and the inner surfaces of the portions 32 of the shoes H is clearly shown in Figure 5, wherein it will be noted that the cutting edges of the lowermost pair of cutters are spaced a substantial distance outwardly from the inner surfaces of the shoes and function to take a rough cut through the flash. The cutting edges of the succeeding pairs of cutters are positioned progressively closer to the inner surfaces of the positioning members H, and the cutting edges of the top pair are substantially flush with the inner surfaces of these members. The construction is such as to gradually remove the flash upon downward movement of the ram and to provide a finished appearance to the welded joint.

It has previously been stated that each cutter or positioning member H is moved into engagement with the blank by hydraulically operated means B. This means comprises a cylinder 34 and a piston 35 reciprocably mounted in the cylinder. The inner end of the piston is recessed, as at 36, for receiving the outer end of the shoe and the latter is locked in the recess by the key 37. Each cylinder 34 is provided with an intake valve C having a seat 38 engageable with a spherically shaped member 39 adapted to be engaged by the inner end of a valve plunger 40 having the outer end connected to the upper end of a rock arm 41 pivotally connected intermediate the ends thereof on the ram 10. As shown in Figure 7, the lower end of the arm is yieldably urged outwardly to normally hold the member 39 spaced from the seat by a spring 42 and this end of the arm is adapted to be engaged by the cam E fixed on the machine frame. The cam E is located to successively engage the lower ends of the arms 41, upon completion of the cutting operation of the cutters, to close the intake valves against the action of the springs 42 and to successively release the arms 41 as the valves are moved by the ram above the blank to be trimmed to permit the springs 41 to open the valves C.

Each cylinder 34 is also provided with an exhaust valve D similar in construction to the intake valve with the exception that a spring 43 urges the valve plunger 44 outwardly with respect to the seat for the spherical valve member permitting the latter to engage said seat. Also the outer end of the valve plunger 44 is merely provided with an enlargement engageable with the cam F to open the valve D against the action of the spring. The cam F is positioned on the frame of the machine to successively open the exhaust valves D as the intake valves C are successively closed by the cam E and to permit the exhaust valves to close prior to opening of the intake valves.

It will be understood that as the intake valves C are successively opened and the exhaust valves D closed, fluid pressure is discharged into the outer ends of the cylinders 34, forcing the pistons 35, positioning members H and cutters A toward each other. The movement of the pairs of positioning members toward each other is limited by the plates 45 adjustably secured to the inner surfaces of the ram sections 11 and 12 by the screws 46 shown in Figure 6. The plates 45 are apertured to receive the positioning members H and form abutments for the inner ends of the pistons 35. In actual practice, the plates 45 are adjusted to provide a space between the inner surfaces of the shoes of each pair slightly less than the thickness of the blank to be trimmed so that a pressure is exerted on the blank by the shoes throughout the cutting operation.

Figure 3:
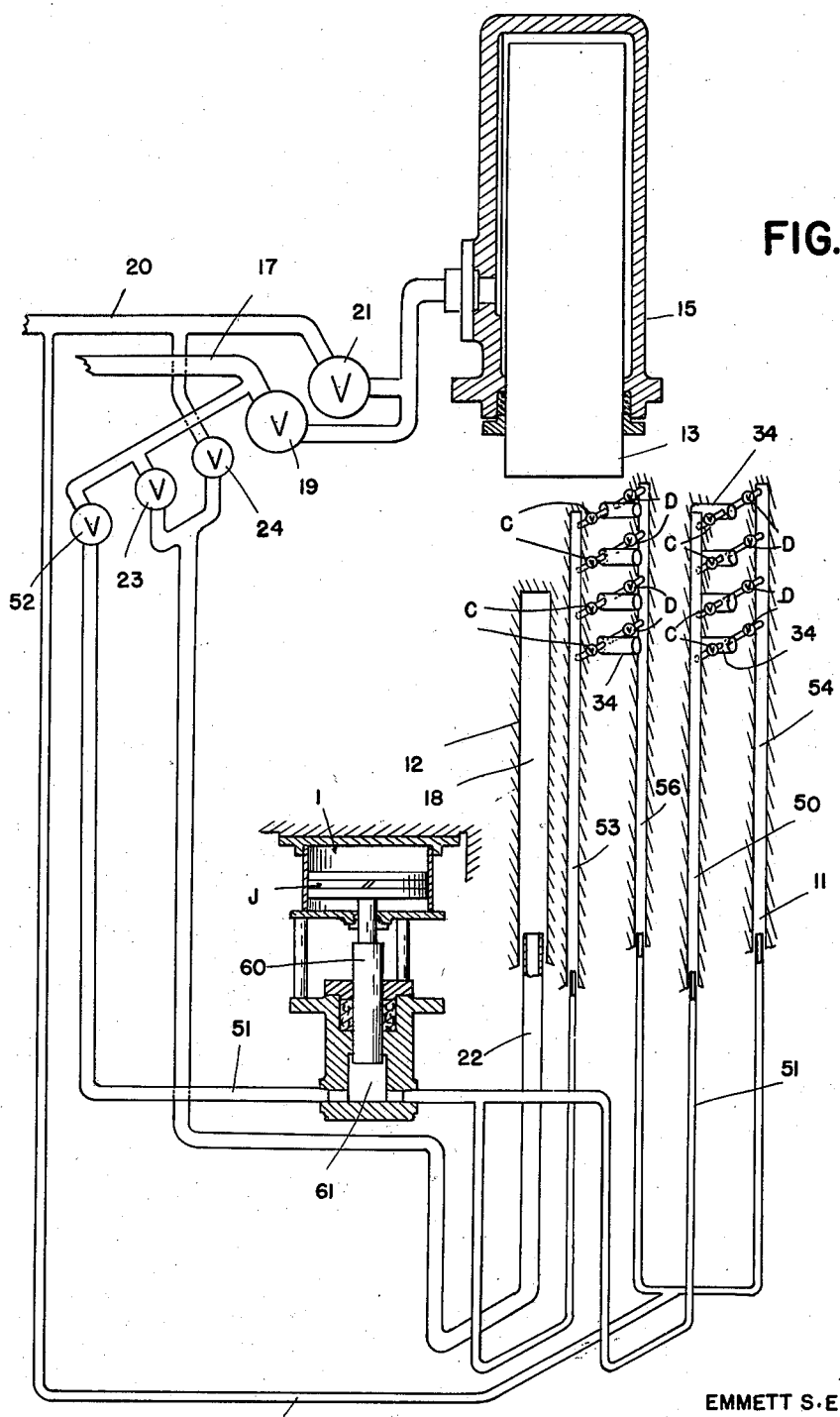
Figure 3 is a diagrammatic view of the hydraulic system.

Referring now to Figure 3 of the drawings, it will be noted that the series of intake valves C on the section 11 of the ram 10 are connected to a common fluid passage 50 having the lower end communicating with a conduit 51, which in turn communicates with the supply line 17 through a valve 52. The opposed series of intake valves C on the section 12 are connected to a common fluid passage 53 communicating at the lower end thereof with the conduit 51. The exhaust valves D on the section 11 are connected to a common exhaust passage 54 communicating with the return line 20 through the medium of a conduit 55, and the opposed exhaust valves D on the section 12 of the ram are connected to the conduit 55 by means of the common exhaust passage 56.

It will be observed from the above that the flow of the hydraulic medium from the supply line 17 to the intake valves C is controlled by a single valve 52. This valve is actuated by a cam 57 secured to the cam shaft 25 and shaped to open the valve 52 when the valve 23 is opened by its cam 27 to admit fluid under pressure to the cylinder 18. The exhaust valve 24 for the cylinder 18 is, of course, closed by its cam prior to opening both the valve 23 and the exhaust valve 21 for the cylinder 15 permitting the ram 10 to move to its uppermost position. During initial upward movement of the ram, the intake valves C are closed and the exhaust valves D are open, permitting the separator G to successively move the positioning members H, with the cutters A outwardly a sufficient distance to clear the blank 30. As soon as the pairs of cutters clear the blank 30, the cams F successively release the exhaust valve plungers 44 and permit the exhaust valves D to close. Upon continued upward movement of the ram 10, the intake valve plungers are also successively released from the cams E and the springs 42 function to open the intake valves C. This permits the fluid under pressure to flow from the supply passages 50 and 53 into the outer ends of the cylinders 34 to move the pistons 35 outwardly against the abutment plates 45. Inasmuch as the positioning members H carrying the cutters A are mounted on the inner ends of the pistons 35, it follows that the cutters are moved to their innermost positions, wherein they are ready to trim the flash from the weld.

When the ram assumes its uppermost position, the intake valve 23 is closed by its cam 27 and the exhaust valve 24 is opened by its cam. Shortly afterward, the exhaust valve 21 is closed and the intake valve 19 is opened by their respective cams, permitting fluid under pressure to flow into the cylinder 15 and move the ram downwardly. As the ram moves in a downward direction, the pairs of cutters progressively remove the flash and as these cutters clear the blank, the intake valves C are closed by the cams E and the exhaust valves D are opened by their cams F. When the ram assumes its lowermost position, all of the cams on the shaft 25 operate to close their respective valves and the machine is ready for another operation.

Considerable importance is attributed to the fact that the positioning members H and, accordingly, the cutters A follow the profile of the blank during the cutting operation so as to completely remove the flash without cutting into the blank, notwithstanding variations in contour or thickness of the blank. As briefly stated above, this is accomplished by interposing an air cylinder in the supply line 51 communicating with both the passages 50 and 53. As shown in Figure 3, the piston J in the air cylinder I is provided with a plunger 60 reciprocably mounted in recess 61 sealed from the air cylinder and communicating with the supply line 51 ahead of the passages 50 and 53. With this arrangement, it will be noted that either or both of the positioning members H of each pair may be moved outwardly during the cutting operation against the relatively non-compressible hydraulic fluid acting on the pistons 35, since this fluid merely backs up into the recess 61 and compresses the air in the cylinder I above the piston J. This feature insures uniformly trimming the flash from the welded blank irrespective of variations in thickness and surface contours.

What I claim as my invention is:

1. In a machine for removing the flash from a surface of a blank having a welded joint, a cutting tool, means for supporting the blank with the flash in a predetermined relation to the cutting tool, means for relatively moving the blank and cutting tool in the direction the flash extends to effect the trimming operation, fluid pressure actuated means for maintaining the cutting edge of the tool into engagement with the flash, means effective upon an increase in thickness of the blank in the region of the weld to move the tool against the action of the fluid pressure an amount corresponding to the variation, and means responsive to the back pressure produced by moving the tool in a direction against the fluid pressure to substantially relieve the back pressure.

2. In a machine for removing the flash from a surface of a blank having a welded joint, a cutting tool, means for supporting the blank with the flash in predetermined relation to the cutting tool, means for relatively moving the blank and cutting tool in the direction the flash extends to effect the trimming operation, means actuated by a relatively non-compressible fluid under pressure for maintaining the cutting edge of the tool into engagement with the flash, means responsive to variations in the thickness of the blank in the region of the weld to move the tool relative to the work an amount corresponding to the variation, and means responsive to the back pressure produced by moving the tool in a direction against the fluid pressure to substantially relieve the back pressure.

3. In a machine for removing the flash resulting from butt welding adjacent edges of a blank together, a support for the blank, opposed cutters positioned to engage the flash extending from opposite sides of the weld, means for relatively moving the blank and cutters in the direction the flash extends to effect the trimming operation, positioning members on opposite sides of the blank engageable with the surfaces of the latter adjacent the weld and carrying the cutters, and fluid pressure actuated means associated with each positioning member for independently urging said positioning members into engagement with the adjacent surfaces of the blank.

4. In a machine for removing the flash from a surface of a blank having a welded joint, a cutting tool, means for supporting the blank with the flash in predetermined relation to the cutting tool, means for relatively moving the blank and cutting tool in the direction the flash extends to effect the trimming operation, a positioning member engageable with the surface of the blank adjacent the weld and carrying said tool, means actuated by a relatively non-compressible fluid under pressure for urging the positioning member into engagement with the blank, means responsive to variations in the relative positions of the blank and cutting edge of the tool during the trimming operation to permit movement of the positioning member against the action of the fluid pressure an amount corresponding to the variations, and a cylinder containing a compressible fluid adapted to compensate for the aforesaid variations.

5. In a machine for removing the flash resulting from butt welding adjacent edges of a blank together, a support for the blank, opposed cutters positioned to engage the flash extending from opposite sides of the weld, means for relatively moving the blank and cutters in the direction the flash extends to effect the trimming operation, positioning members on opposite sides of the blank engageable with the surfaces of the latter adjacent the weld and carrying the cutters, means associated with each positioning member and actuated by a relatively non-compressible fluid under pressure for independently urging the positioning members into engagement with opposite sides of the blank, and means effective upon an increase in thickness of the blank in the region of the weld to permit movement of the positioning members against the action of the fluid pressure acting on said members.

6. In a machine for removing the flash from a surface of a blank having a welded joint, means for supporting the blank, a plurality of cutting tools arranged in predetermined relation to the flash of said blank, said cutting tools being differentially spaced from said blank, means for relatively moving the blank and the cutting tools in the direction the flash extends to progressively effect the trimming operation, fluid pressure means for maintaining the cutting edges of the tools into engagement with the flash, and means effective upon an increase in thickness of the blank in the region of the weld to move the tools against the action of the fluid pressure an amount corresponding to the variation.

7. In a machine for removing the flash from a surface of a blank having a welded joint, means for supporting the blank, a plurality of cutting tools arranged in predetermined relation to the flash of said blank, said cutting tools being differentially spaced from said blank, means for relatively moving the blank and the cutting tools in the direction the flash extends to progressively effect the trimming operation, means effective upon variations in the thickness of the blank in the region of the flash to relatively move the tools and blank in directions to vary the depth of cut an amount corresponding to the variation in thickness aforesaid, and means associated with each cutting tool for independently urging said tools toward said blank, said last named means being operated in timed relation to the relative movement of said blank and cutting tools.

8. In a machine for removing the flash from a surface of a blank having a welded joint, a support for the blank, opposed cutters positioned to engage the flash extending from opposite sides of the weld, means for relatively moving the blank and cutters in the direction the flash extends to effect the trimming operation, independent fluid pressure actuated means for maintaining the cutting edges of the cutters into engagement with the flash on opposite sides of the weld, and positioning members on opposite sides of the blank engageable with the surfaces of the latter adjacent the weld and secured to the cutters to vary the depth of cut in accordance with variations in the surface profiles of the blank.

9. In a machine for removing the flash from a surface of a blank having a welded joint, a cutting tool, means for supporting the blank with the flash in a predetermined relation to the cutting tool, means for relatively moving the blank and cutting tool in the direction the flash extends to effect the trimming operation, fluid pressure actuated means for maintaining the cutting edge of the tool into engagement with the flash, means effective upon a variation in the surface profile of the blank to move the tool relative to the blank an amount corresponding to the variation, and means responsive to the movement of the tool relative to the blank to compensate for the displacement effected thereby.

EMMETT S. ELLIS.